United States Patent [19]
Wellstein

[11] 3,812,910
[45] May 28, 1974

[54] POSITIVE SEAL PITLESS WELL ADAPTER

[76] Inventor: William Wellstein, P.O. Box No. 430, Fostoria, Ohio 44830

[22] Filed: Nov. 20, 1972

[21] Appl. No.: 308,025

[52] U.S. Cl. .................................. 166/88, 285/209
[51] Int. Cl. .......................................... E21b 33/03
[58] Field of Search ...... 166/88; 285/161, 197, 206, 285/209, 210, 131 A

[56] References Cited
UNITED STATES PATENTS

| | | | |
|---|---|---|---|
| 978,504 | 12/1910 | Stewart | 285/209 |
| 1,364,814 | 1/1921 | Saucke | 285/208 |
| 2,689,611 | 9/1954 | Martinson | 166/88 |
| 2,851,106 | 9/1958 | Dicken | 166/88 |
| 3,403,730 | 10/1968 | Williams | 166/88 |
| 3,467,181 | 9/1969 | Maass | 166/88 |

*Primary Examiner*—James A. Leppink

[57] ABSTRACT

A pipe connector having a duct therethrough for connecting a lateral pipe to a well casing and having an inner casing connector provided with a tubular stem which extends through a hole in the well casing wall. Mounted on this stem externally of the casing wall are a casing contacting O-ring gasket, a follower washer, a stem O-ring gasket and a compression nut which compresses the gaskets into fluid - tight engagement with the casing wall and the stem upon which they are mounted. Also annular grooves to partially seat these O-ring gaskets are provided in the faces of the follower washer and/or the gasket confronting face of the nut.

5 Claims, 4 Drawing Figures

3,812,910

POSITIVE SEAL PITLESS WELL ADAPTER

BACKGROUND OF THE INVENTION

This invention relates to means for positively sealing a lateral pipe or duct to a well casing side wall, and to means for assembling and disassembling a connecting means for a duct through a hole in the casing side wall.

One application for this type of connecting means is found in water well systems, such as shown in U.S. Pat. No. 2,689,611, issued Sept. 21, 1954 to Martinson, wherein a number of functional parts below the surface of the ground cooperate to transmit water or fluid from a well through a hole in a well casing side wall to a lateral duct.

An important problem is the sealing of this below surface casing hole when a detachable connecting means is used, which will prevent infiltration of surface water and any other accompanying impurities, such as from septic tank areas or the like and which will satisfy various local installation codes.

SUMMARY OF THE INVENTION

Generally, the device of this invention comprises a two-part well casing side duct connector for use in a well system having a casing with a selectively placed hole in the wall thereof. One part of this connector comprises an inner casing stem connector or hanger which has a threaded end that projects outwardly through the hole in the well casing and has a lateral duct therethrough, a flanged guideway on its inner end, the other side of which guideway has an arcurate casing confronting flange surface. The other part comprises a drop pipe slide or plate member having an elbow duct therein, one end of which duct is aligned with and sealingly engages an end of the duct in the first part or casing stem connector, and the other end of which elbow duct is connected to a pipe extending down the inside of the well casing.

The stem connector part is releasably sealingly connected to the well casing by a casing contacting resilient sealing means or O-ring gasket of elliptical cross-section which encircles the unthreaded central or neck portion the lateral tubular stem and engages the outer surface of the well casing around the hole therethrough. A follower washer encircling this central unthreaded or neck portion of the stem engages and partially seats this casing gasket in an annular groove in its casing confronting face to compress it when it is urged toward the well casing. A resilient stem O-ring gasket also encircling the smooth central portion of the tubular stem engages the other surface of this follower washer. A compression nut screw threaded on the threaded tubular stem partially compresses this stem gasket between it and the follower washer in an annular groove or seat in one or the other of these parts, and urges the follower washer toward the well casing to compress the contacting gasket thereagainst. The gasket confronting face of this compression nut is provided with an annular means, such as a counterbore or undercut, so a portion thereof will overlie the smooth unthreaded central neck portion of the stem to urge positively the follower washer toward the well casing and positively compress this casing gasket after the stem O-ring is compressed between the adjacent surfaces of the stem and washer as well as compressed inwardly against the unthreaded neck portion of the stem.

OBJECTS AND ADVANTAGES

Accordingly, it is an object of this invention to provide a well casing with a side duct or pipe which will readily form a positive sealed passageway through a hole in the wall of a well casing irrespective of normal irregularities in the hole or casing and which will also meet local sanitation codes.

It is another object of this invention to provide an efficient simple, effective, economic, rugged, dependable, and positively sealed casing side pipe connector.

BRIEF DESCRIPTION OF THE VIEWS

The above mentioned and other features, objects and advantages and a manner of attaining them are described more specifically below by reference to embodiments of this invention shown in the accompanying drawings, where:

DETAILED DESCRIPTION OF THE PREFERRED EMBODIMENTS

Figure 1:
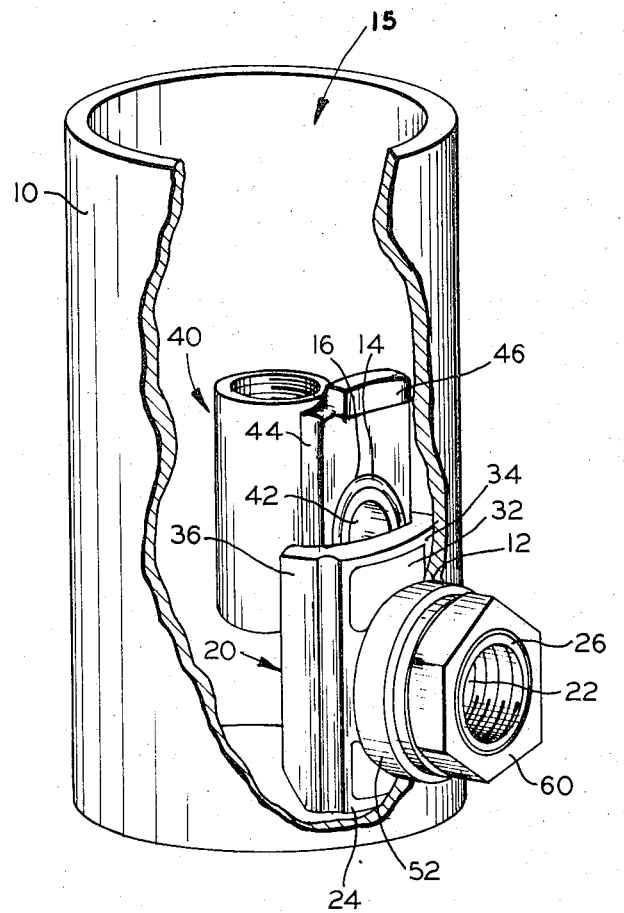
FIG. 1 is a perspective view of one embodiment of a positively sealed well casing pipe connector of this invention with part of the casing broken away and showing the drop pipe slide member partially inserted in the guideway of the inner casing stem connector.
Figure 2:
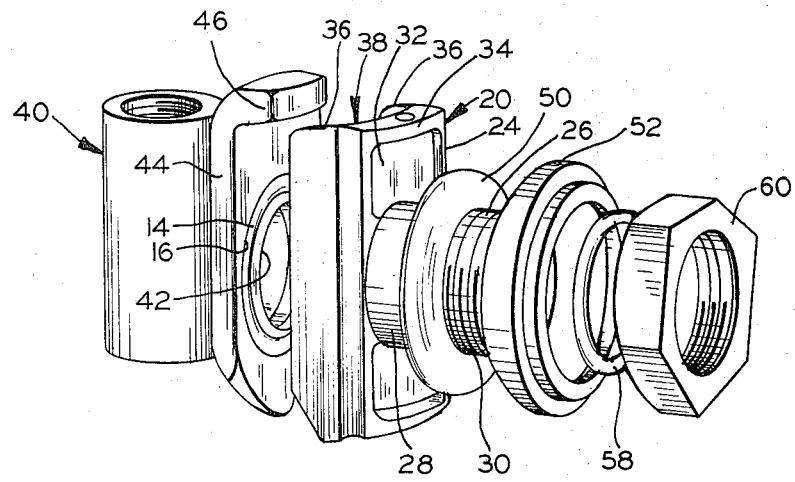
FIG. 2 is an exploded perspective view of the pipe connector shown in FIG. 1.

Referring to the drawings, particularly FIG. 1, there is shown a well casing 10 having a duct 15 therein and having a selectively placed hole 12 intermediate its ends and containing an inner casing stem connector member or hanger 20 carried by the casing 10 and a drop pipe slide member 40 carried by the hanger 20. Each of these members 20 and 40 have ducts 22 and 42, respectively, therein adjacent ends of these ducts 22 and 42 may be sealing engaged to each other by an O-ring gasket 14 in a groove or seat 16 in one of these members, here shown to be in the drop slide member 40, to form a sealed passageway which extends through the lateral casing hole 12. The other end of the duct 22 is connected to a lateral pipe 13 and the other end of the duct 42 is connected to the vertical drop pipe 11 in the well casing 10.

The stem connector member 20 fits adjacent to the inner wall of the well casing 10 at and around the hole 12 thereof and is provided with a flange or body portion 24 from which extends a tubular stem 26 having a smooth central or unthreaded neck portion 28 and an externally straight threaded end portion 30. The body portion 24 is provided with an arcuate casing confronting surface 32 having a raised rim 34 which snuggly bears against the inner surface of the well casing 10 around the hole 12. The tubular stem 26 extending outwardly from this surface 32, fits with clearance in the hole 12 and projects outside the casing 10. Also carried by this body portion 24 and extending from the side remote from the casing confronting surface 32, are L- shaped flanges 36 defining a guideway 38 for the drop slide member 40.

This drop pipe slide member 40 is provided with a vertically extending plate member 44 which is snuggly and slidably received in the guideway 38. Any suitable means may be provided to ensure alignment of the passages 22 and 42 such as a stop flange 46 which engages the upper end of the guideway 38 to limit downward movement of the plate 44 to align these passageways 22 and 42.

A first resilient sealing means or casing O-ring gasket 50, which may be of elliptical cross-section and shape, encircles the smooth central surface 28 of the stem 26 and engages the outer surface of the well casing 10 around the hole 12. The elliptical cross-section of this gasket 50 provides a surface contact when bent around curvatures of well casing 10 from 5 inches to 7 inches in diameter.

A follower washer 52 having a laterally concave face containing an annular seat or groove 54 and having a cross-section at least slightly less than the cross-section of the aforementioned casing gasket 50, encircles the smooth central portion 28 of the stem 26 and engages the gasket 50 to compress this gasket against the outer surface of the casing 10 when it is urged toward the casing 10. This annular groove or seat 54 bends the gasket 50 cylindrically to ensure a fluid tight engagement with the outside cylindrical surface of the casing 10, regardless of any irregularities in its surface.

A second resilient sealing means or stem O-ring gasket 58 encircles and also snuggly engages the smooth portion 28 of the stem 26, as well as engages the other side or surface of the washer 52. This gasket 58 shuts out seepage along the stem from the thread 30 by being limitedly compressed against a face of the washer 52 and the stem portion 28. The limited compression of this gasket 58 is obtained by placing it in an annular groove having an axial cross-section just slightly less than the axial cross-section of the annular gasket 58. Thus, in the embodiment shown in FIG. 3, the other or outer face of the washer 52 is provided with an annular groove 55 to receive and control the amount of compression of this gasket 58, while in the embodiment shown in FIG. 4, a nut 60' is provided with a similar groove 55' to receive and control the compression of this gasket 58.

A compression nut 60 carried on the threaded end 30 of the stem 26 compresses the O-ring 58 against the outer surface of the washer 52 and the stem 26. This nut 60 is screwed inwardly until the follower washer 52 compresses the gasket 50 and presses against the casing 10 to thereby effect a fluid tight seal between the stem connector member 20 and the casing 10. To ensure that the nut 60 pushes the gasket 58 beyond the threaded end 30 of the stem 26 and positively compresses the gasket 50, the nut 60 is provided with an annular means 62 to overlie the smooth central portion 28 of the stem 26. Thus in the embodiment shown in FIG. 3, the nut 60 is provided with a counterbore 64 in its washer confronting face so as to have a portion 62 which overlies the smooth central portion 28 of the stem 26, and the embodiment shown in FIG. 4 is provided with a similar counterbore 64' to also have a portion 62' which overlies the central portion 28 of the stem 26.

Figure 3:
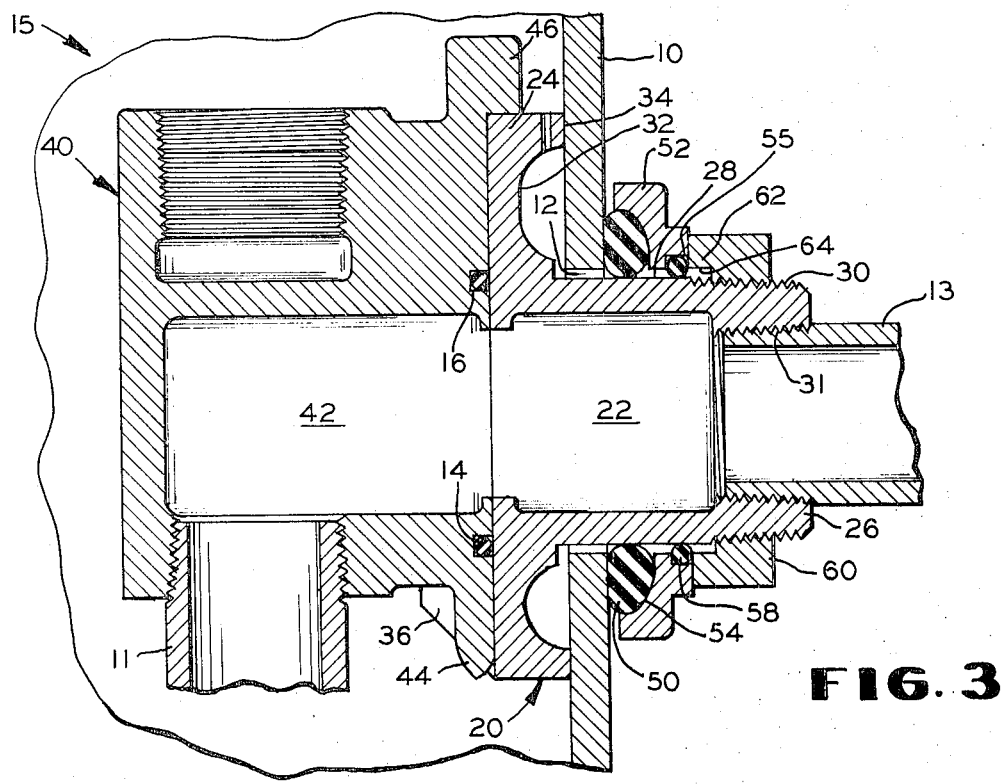
FIG. 3 is an enlarged vertical sectional view of the pipe connector shown in FIG. 1 showing the stem O-ring gasket seated in the washer.
Figure 4:
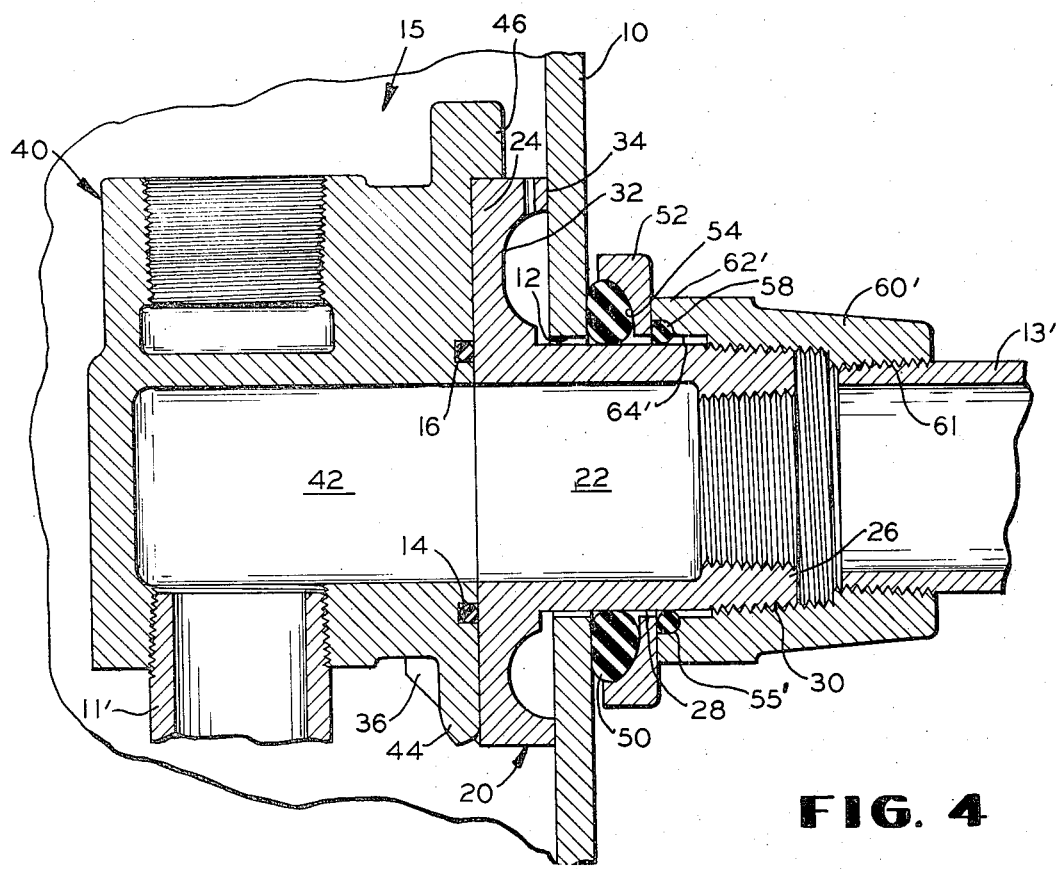
FIG. 4 is an enlarged vertical sectional view similar to FIG. 3 of another embodiment of this invention but showing the stem O-ring gasket seated in the compression nut and a different size side duct adapter nipple connected to the stem.

The embodiment of the pipe connector shown in FIG. 3 is adapted for a 1 inch diameter drop or down pipe 11. Thus the outer end of the stem 26 is provided with internal threads 31 for the connection with a 1 inch diameter lateral pipe 13. In the embodiment shown in FIG. 4 the body portion of the drop pipe slide 40 is modified to connect a 1¼ inch diameter drop or down pipe 11' although the slide plate 44 and its cooperating parts are the same as in the embodiment shown in FIG. 3. However, in this instance the body of nut 60' is extended beyond the end of the stem 30, and is provided with internal threads 61 for connection of an 1¼ inch diameter lateral pipe 13'.

While there is described above the principles of this invention in connection with specific apparatus, it is to be clearly understood that this description is made only by way of example and not as a limitation to the scope of this invention.

I claim:

1. A means for sealing side duct in a hole in a casing comprising:
   A. a stem member extending through the hole in the casing having at one end a flange portion contacting one side of said casing around the hole and at its other end an outside threaded portion extending short of the other side of said casing to provide an intermediate unthreaded portion,
   B. a first O-ring type gasket around the central unthreaded portion of said stem member contacting the other side of said casing,
   C. a washer member having a seat for said first gasket,
   D. a second O-ring type gasket around the central unthreaded portion of said stem member contacting the opposite side of said washer member from said first gasket,
   E. a nut member threaded on said threaded portion of said stem having annular unthreaded means projecting inwardly over said unthreaded portion for engaging contact with both said second gasket and said washer member for forcing both said first gasket against said casing and said second gasket against said washer member and said central unthreaded portion of said stem, and
   F. a seat for said second gasket in one of its two contacting members.

2. A side duct connector according to claim 1 wherein washer member has a seat for said resilient sealing means and said sealing means projects beyond said seat.

3. A side duct connector according to claim 1 wherein said resilient sealing means has an elliptical cross-section.

4. A side duct connector according to claim 1 wherein said seat is in said washer member.

5. A side duct connector according to claim 1 wherein said seat is in said nut member.

* * * * *